United States Patent
Moharram

(10) Patent No.: US 6,473,402 B1
(45) Date of Patent: Oct. 29, 2002

(54) COMMUNICATIONS LINK INTERCONNECTING SERVICE CONTROL POINTS OF A LOAD SHARING GROUP FOR TRAFFIC MANAGEMENT CONTROL

(75) Inventor: Omayma El-Sayed Moharram, Carleton Place (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/815,258

(22) Filed: Mar. 11, 1997

(51) Int. Cl.[7] .............................................. H04M 15/00
(52) U.S. Cl. ...................... 370/236; 370/410; 370/507; 379/207; 379/229; 707/10; 707/200
(58) Field of Search ................................ 370/229, 230, 370/231, 232, 233, 234, 235, 236, 409, 410, 503, 507; 379/111, 112, 113, 115, 133, 134, 220, 221, 224, 227, 229, 230; 707/8, 9, 10, 200

(56) References Cited

U.S. PATENT DOCUMENTS

| | | | | |
|---|---|---|---|---|
| 5,268,895 A | * | 12/1993 | Topper | 379/220 |
| 5,438,568 A | | 8/1995 | Weisser, Jr. | 370/60 |
| 5,499,290 A | * | 3/1996 | Koster | 379/224 |
| 5,546,574 A | * | 8/1996 | Grosskopf et al. | 379/201 |
| 5,553,130 A | * | 9/1996 | Turner | 379/220 |
| 5,570,410 A | | 10/1996 | Hooshiari | 379/32 |
| 5,579,318 A | * | 11/1996 | Reuss et al. | 370/410 |
| 5,581,610 A | * | 12/1996 | Hooshiari | 379/133 |
| 5,701,301 A | * | 12/1997 | Weisser Jr. | 370/428 |
| 5,778,057 A | * | 7/1998 | Atai | 379/220 |
| 5,890,156 A | * | 3/1999 | Rekieta et al. | 707/10 |

OTHER PUBLICATIONS

Tsolas, N et al: "Performance And Overload Considerations When Introducing IN Into An Existing Network", International Zurich Seminar On Digital Communications Intelligent Networks And Their Applications, Jan. 1, 1992, pp. 407–414, XP000570865, see p. 411, right-hand col., line 26, p. 412, left-hand col., line 10.

(List continued on next page.)

*Primary Examiner*—Ricky Ngo
(74) *Attorney, Agent, or Firm*—Allan P. Millard

(57) ABSTRACT

In the Intelligent Networks environment, where multiple Service Providers and multi-Vendor equipment are involved in new service offering, the risk of overloading the network elements are real and managing the traffic is a challenge. Network traffic overloads could result from equipment failures, major equipment outages, or widespread loads above engineered levels. To solve the problem of network traffic overload, a direct link interconnect feature between the two SCPs that are deployed in load sharing mode in the network is provided. The communications link interconnects the two SCPs within the load sharing group, whereby the SCPs may exchange information on their congestion levels and controls as well as route queries to the SCP that is not overloaded.

6 Claims, 8 Drawing Sheets

OTHER PUBLICATIONS

Bray, M: "Impact of New Services On SCP Performance", International Conference On Communications, Including Supercomm Technical Sessions, Atlanta, Apr. 15–19, 1990, vol. 1, No.–, Apr. 15, 1990, Institute of Electrical And Electronics Engineers, pp. 241–247, XP000147409, see p. 244, right–hand col., line 1–p. 246, left–hand col. line 26.

Kawamura, H. et al, "A Congestion Control System For An Advanced Intelligent Network" 1996 IEEE Network Operations And Management Symposium (NOMS), Kyoto, Apr. 15–19, 1996, vol. 2, No. SYMP. 5, Apr. 15, 1996, Institute of Electrical And Electronics Engineers, pp. 628–631, XP000634828, see the whole document.

Hirano, M. et al: "Distributed Control Node Architecture In The Advanced Intelligent Network", ISS '95. World Telecommunications Congress. (Int. Switching Symposium), Advanced Switching Technologies For Universal Telecommunications At the Beginning of The $21^{st}$ Century Berlin, Apr. 23–28/95, vol. 2, No. SYMP. 15, Apr. 23, 1995, Verband Deutscher Elektrotechniker (VDE) et al, pp. 278–282, XP000495667, see p. 279, para. 4.1.

* cited by examiner

SSC AND SSA MESSAGES ENCODING FORMAT

| SIZE | BITS | | | | | | | |
|---|---|---|---|---|---|---|---|---|
| | 8 | 7 | 6 | 5 | 4 | 3 | 2 | 1 |
| 1 OCTET | MESSAGE TYPE ||||||||
| 1 OCTET | SPARE | LENGTH INDICATOR (LI) |||||| QIND |
| 1 OCTET | SCP SUBSYSTEM NUMBER (SSN) ||||||||
| 1 OCTET | SCP MACHINE CONGESTION LEVEL 1 (SCP_MC1) ||||||||
| 1 OCTET | SCP MACHINE CONGESTION LEVEL 2 (SCP_MC2) ||||||||
| 1 OCTET | SCP MACHINE CONGESTION LEVEL 3 (SCP_MC3) ||||||||
| 3 OCTETS | ORIGINATING SCP ADDRESS (O_SCP_ADDRESS) ||||||||
| 3 OCTETS | DESTINATION SCP ADDRESS (D_SCP_ADDRESS) ||||||||
| 8 OCTETS | GLOBAL TITLE ADDRESS/TRANSLATION TYPE (GTA/TT) ||||||||
| 3 OCTETS | SCP MACHINE CONGESTION TIME (SCP_MC_TIME) SEE FIG. 8 ||||||||
| 1 OCTET | ADDITIONAL INFORMATION ||||||||

FIG. 7

SCP MACHINE CONGESTION TIME

| | 8 | 7 | 6 | 5 | 4 | 3 | 2 | 1 |
|---|---|---|---|---|---|---|---|---|
| 1 OCTET | NULL IND || MONTH |||| YEAR ||
| 1 OCTET | SPARE |||| DATE ||||
| 1 OCTET | SPARE || MINUTE ||| HOUR |||

FIG. 8

COMMUNICATIONS LINK INTERCONNECTING SERVICE CONTROL POINTS OF A LOAD SHARING GROUP FOR TRAFFIC MANAGEMENT CONTROL

RELATED APPLICATION

This application is related to U.S. patent application Ser. No. 08/815,260, now U.S. Pat. No. 5,825,860, entitled "Load Sharing Group Of Service Control Points Connected To A Mediation Point For Traffic Management Control", which was filed concurrently herewith and is incorporated herein by reference.

BACKGROUND OF THE INVENTION

This invention relates generally to Intelligent Networks for telecommunications and, in particular, to load sharing between a group of Service Control Points for traffic management control within the network.

With reference to FIG. 1, as is well known, an Intelligent Network (IN) includes various network elements (NEs), such as, Service Switching Points (SSPs), Service Control Points (SCPs), Adjuncts, Intelligent Peripherals (IPs), and Mediation Points (MPs). The IN service offering implies cooperation between different network elements, typically the SSPs and SCPs, using the Common Channel Signaling No. 7 (CCS7) network protocols.

An Operations, Administration, and Maintenance (OAM) management environment is characterized by functionality to ensure reliable operation of the IN. Telecommunication Management Network (TMN) components providing the network OAM management include a Services Management System (SMS), Surveillance and Testing Operations Systems, and Network Traffic Management (NTM) Operations Systems (OSs). Measurements, logs and alarms related to network operations and services are generated by the NEs and collected by the OSs for OAM management. The Surveillance and Testing Operations Systems (OSs) provide fault management. The main objective of the Network Traffic Management OSs is to manage overload controls at the various NEs and to ensure service reliability and network integrity.

The NTM consists of monitoring and control functions aimed at the detection of abnormal load conditions and excessive traffic congestion, activation, de-activation and monitoring of overload controls. The IN NTM requirements in [1] GR-1298-CORE, Advanced Intelligent Network (AIN) Switching Systems Generic Requirements, Bellcore, Issue 3, July , 1996; [2] Draft Revised ITU-T Recommendation Q.1218, Interface Recommendation for Intelligent Network CS-1. COM 11-R 104E, May 1995; and [3] ITU-T Recommendation E.412, Telephone Network and ISDN Quality of Service, Network Management and traffic Engineering, Network Management Controls, emphasize the need for automatic call-associated query and non-call-associated signaling messages limiting controls triggered by detected congestion conditions at one or more connected equipment. These controls minimize congestion conditions, due to traffic overloads (or reduced call processing capacity) at the NE, from spreading to the subtending NEs and throughout the rest of the network.

Automatic Code Gapping (ACG) is a network management mechanism used in the control of network congestion. For example, if an SCP becomes congested with queries, it can issue a request to slow down or stop a SSP from sending queries for a predetermined period. When an SCP finds that it is being overloaded with queries, it automatically issues a request that the SSP slow down or stop sending queries, matching a certain criterion or criteria, for a given duration of time. The criteria and the request can also be manually initiated from the service management system (SMS). Both automatic- and manually-initiated requests are relayed from the SCP to the SSP in the form of an ACG message. From the SCP/SMS initiated ACG request messages, a list of controls is created and maintained against which pending SCP destined queries are checked. During call processing, prior to sending an IN query, the ACG controls are checked to determine whether the query is to be gapped (that is, blocked). If the criteria specified in the control matches that for the pending query, then the query is gapped, and either IN final treatment or Default Routing is applied to the call.

Implementation of the Automatic Code Gapping (ACG) mechanism consists of procedures in the SCPs for detecting and identifying the congestion level at the SCP, messages for communicating the SCP congestion level back to the SSPs, and procedures in the SSPs for throttling back the traffic. The ACG controls are all based on indirect routing of SCP queries. A traffic control item is identified by its Global Title Address (GTA) and Translation Type (TT), which are converted at the Signaling Transfer Point (STP) to the signaling point code of the destination SCP and SubSystem number (SSN) of the particular application or application set at that SCP. An ACG request to a SSP tells it to regulate sending the traffic using specific gap interval and duration. The ACG control can be initiated from the SCP in two ways: (1) automatically via SCP initiated code control; and (2) manually via the SMS Originated Code Control (SOCC). The manual SOCC method complements the automatic SCP method.

Having regard to the automatic SCP controls, when the SSP receives an ACG message with a control cause indicator of ISCP Overload,, it places the TT and 6-digit GTA on the SCP overload controls list. Timers for both gap interval and duration are started by the SSP when the control is added. Subsequent calls being processed by the SSP that generate queries with a called or charged number, matching the 6 digit code for the given TT are gapped until a period of time equal to the gap interval expires. After the gap interval expires the SSP allows the next applicable query to proceed normally. After this query has been sent, the SSP resumes blocking for another period of time equal to the gap interval. This cycle continues until a period of time equal to the duration has passed. The SCP overload control is removed from the controls list when the duration expires.

For the manual SOCC controls, when the SSP receives an ACG message with Control Cause Indicator of "SMS Originated", it places the "TT and 3-, 6-, 7-, 8-, 9-, or 10-digit GTA" control on the SOCC controls list. Timers for both gap interval and duration start when that control is added. After the control with a TT and GTA is added to the SOCC controls list and the gap interval timer has been started, calls which generate queries with "called or charged number +TT" matching the GTA+TT in the SOCC controls list are gapped until the gap interval expires. After the gap interval expires, the SSP allows the next applicable query to proceed normally. After this query has been sent, the SSP resumes blocking for another period of time equal to the gap interval. This cycle continues until a period of time equal to the duration has passed. The control is removed from the SOCC controls list when the duration expires.

Code gapping is a form of rate control. The SSP uses code gapping to regulate the queries destined to the SCP. Code gapping limits the number of initial queries per second, which is exemplified in FIG. 2. The arrows represent time when queries would normally be sent from the SSP to the SCP. When gapping is initiated, all queries from the source are blocked during the first gap interval, after which the next query may pass. Once a query passes, then all queries are blocked for the following gap. At most one query per gap interval will pass. This pattern repeats until the duration timer expires or the call gapping is de-activated.

FIG. 3 illustrates by way of example operation of code gapping control, wherein a duration of 15 seconds and gap interval of 5 seconds is employed. As shown in the figure, when the SSP receives an ACG request from an overloaded SCP, it initializes a duration timer and a gap timer. From 3 to 8 seconds, queries to the SCP are blocked (that is, no queries are sent to the SCP). When the gap timer expires, the next query is sent to the SCP. When the SSP sends a query to the SCP, it resets the gap timer (as shown at the 16th second), and the SCP processes the query and checks to see if the control should stay active. The SSP blocks queries from the 16 to 18 seconds, after which the duration timer expires. From the 18 seconds onward, queries are sent to SCP.

A potential problem with conventional code gapping may be an unfair throttling of SSP traffic. The SSP uses a gap interval and duration to regulate queries to the SCP and sends excess queries to reorder tone or announcement. When gapping is initiated, all queries from the SSP are blocked during the first gap interval, after which the next query may pass. Once a query passes then all queries are blocked for the following gap interval. Thus at most one query per gap interval will pass. The pattern of one query accepted followed by an interval in which all are blocked repeats until a duration timer expires. In this mechanism the same gap interval and duration are applied to all SSP offices. The control throttles large office much more severely than small offices. This results in unfair treatment between large and small offices. The control alternatingly turns traffic on and off, and the off period may be too long. Further, large offices can be expected to throttle a higher percentage of traffic than smaller offices. This mechanism does not take the SSP office size into consideration.

Another deficiency of conventional code gapping may be poor SCP resource utilization in connection with a load sharing SCP group. Operating companies replicate services on multiple SCPs for load sharing and reliability. An illustration of replicated SCPs (or Load Sharing SCPs) deployment is shown in FIG. 4. Typically, each SCP in the group is identified by the same point code and the STP cyclically selects each SCP in sequence to process respective queries which it receives from SSPs.

If one SCP in the load sharing SCP group is overloaded, it tells the SSPs to regulate the traffic destined to it. Since the SSPs view the load sharing SCP group as a single entity and the traffic control item is identified by its Global Title Address (GTA) and Translation Type (TT), the SSP applies the control to all calls that generate queries with matching GTA/TT. For example, if one of the multiple SCPs, say SCP-A, in a load sharing SCP group sends an overload control request to the SSP, all calls which match the GTA/TT under control will be blocked by the SSP even if the other SCPs in the group, namely SCP-B could process those queries. This results in poor SCPs resources utilization.

Yet another problem may be control instability. If SCP-B is not overloaded, it might request the SSP to remove the control. This results in control request and removal messages exchanges between the SSP and the load sharing SCP group. Excessive messages between the SSPs and load sharing SCP group may result in network traffic congestion and network performance degradation.

This problem further results in the instability of the controls. For two SCPs in the load sharing group, a control could be activated by one SCP and removed by the other constantly. The SCP under congestion will be processing queries not being blocked by the SSP and might get in severe overload state. This may happen, for example, in the period between the moment where the control is removed by SCP-B and the moment where a new control is activated by SSP, which is represented by the "danger" zone in FIG. 5. This problem exists because the replicated SCPs do not communicate between each other to synchronize their active controls lists. One SCP does not know that another SCP requested a control for the common service SubSystem Number (SSN).

It is, therefore, desirable to resolve at least some of the identified load sharing SCPs traffic management control problems.

SUMMARY OF THE INVENTION

It is an object of the present invention to provide a new and improved load sharing service control point group.

The invention, therefore, according to a first broad aspect provides a method for synchronizing operation of a plurality of service control points (SCPs) in a load sharing group, comprising the steps of: maintaining, by each SCP, respective controls lists for the plurality of SCPs, each controls list identifies controls which are active at the corresponding SCP; generating a new control by any one SCP of the plurality of SCPs in the load sharing group; at the any one SCP, updating the controls list corresponding to itself to add the new control and sending an add control signal which identifies the new control to all other SCPs of the plurality of SCPs in the load sharing group; and at each of the other SCPs, updating the controls list corresponding to the any one SCP, that each maintains, to add the identified new control.

In accordance with a second broad aspect of the invention, there is provided a load sharing group of service control points (SCPs), comprising: two SCPs; and a communications link interconnecting the two SCPs.

In particular, the two SCPs each maintains a first controls list which identifies active controls at that SCP and a second controls list which identifies the active controls at the other SCP.

More particularly, when either of the two SCPs adds a new control to its first controls list, that SCP sends a subsystem congestion message which identifies the new control, over the communications link, to the other SCP which in response updates its second controls list by adding the identified new control. Furthermore, when either of the two SCPs removes an existing control from its first controls list, that SCP sends a subsystem available message which identifies the existing control, over the communications link, to the other SCP which in response updates its second controls list by removing the identified existing control.

BRIEF DESCRIPTION OF THE DRAWINGS

The invention will be better understood from the following description of a preferred embodiment together with reference to the accompanying drawing, in which:

FIG. 7 is a structural representation of an encoding format common to both SubSystem Congestion (SSC) and SubSystem Available (SSA) messages;

FIG. 8 is a structural representation of an encoding format for the machine congestion time field in the SSC and SSA messages.

DETAILED DESCRIPTION

Figure 1:
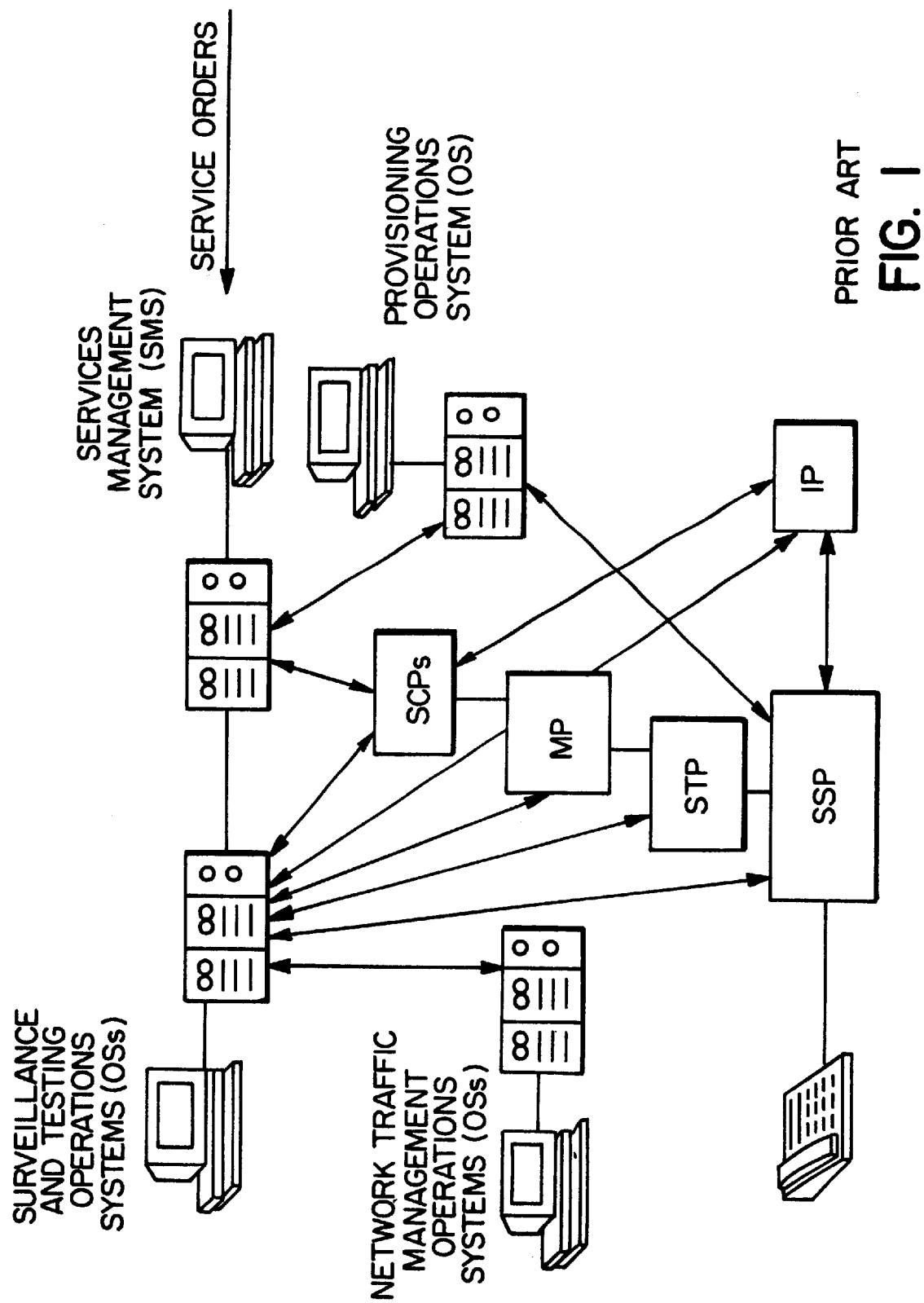
FIG. 1 is a schematic illustrating a typical IN with an Operations, Administration and Maintenance management environment.
Figure 2:
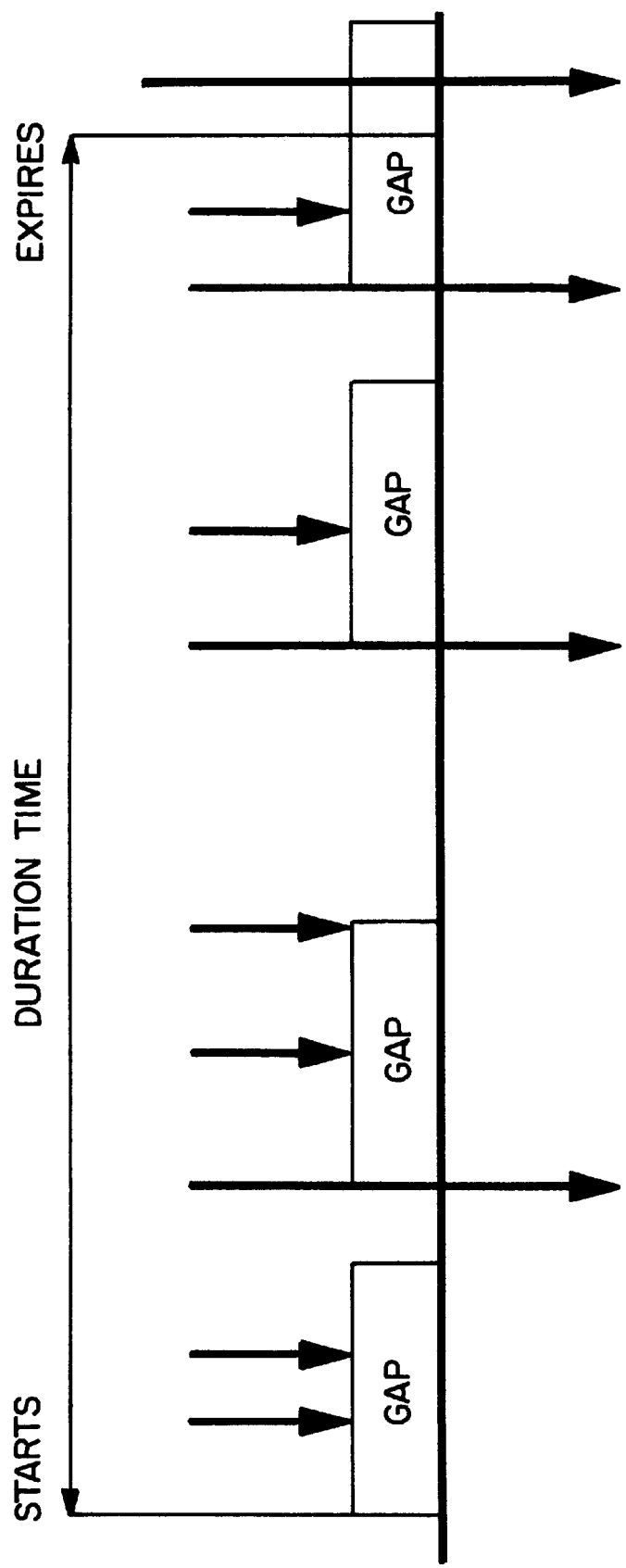
FIG. 2 is a timing graph illustrating a definition of code gapping for network congestion control.
Figure 3:
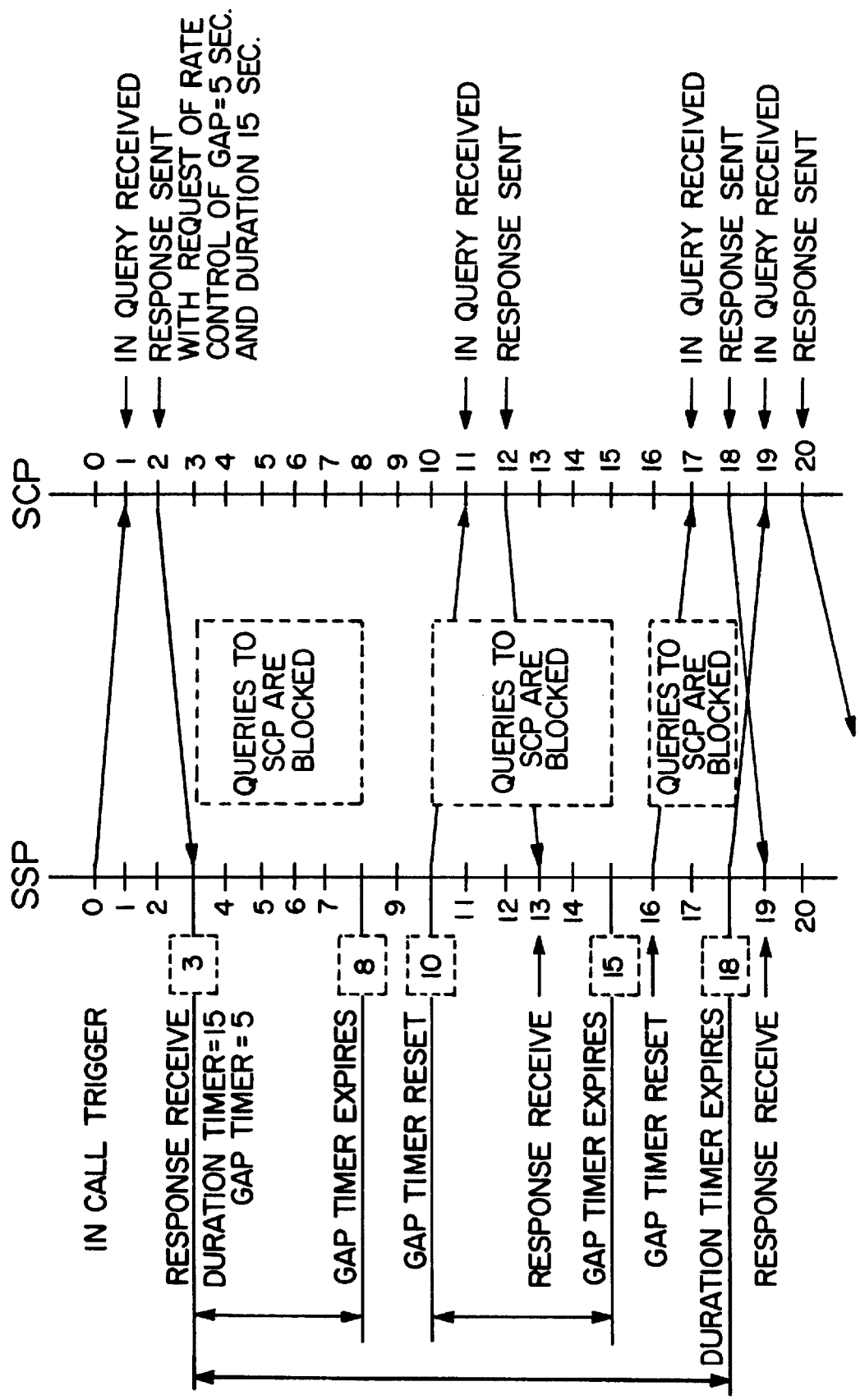
FIG. 3 is a timing graph illustrating an example of code gapping in operation.
Figure 4:
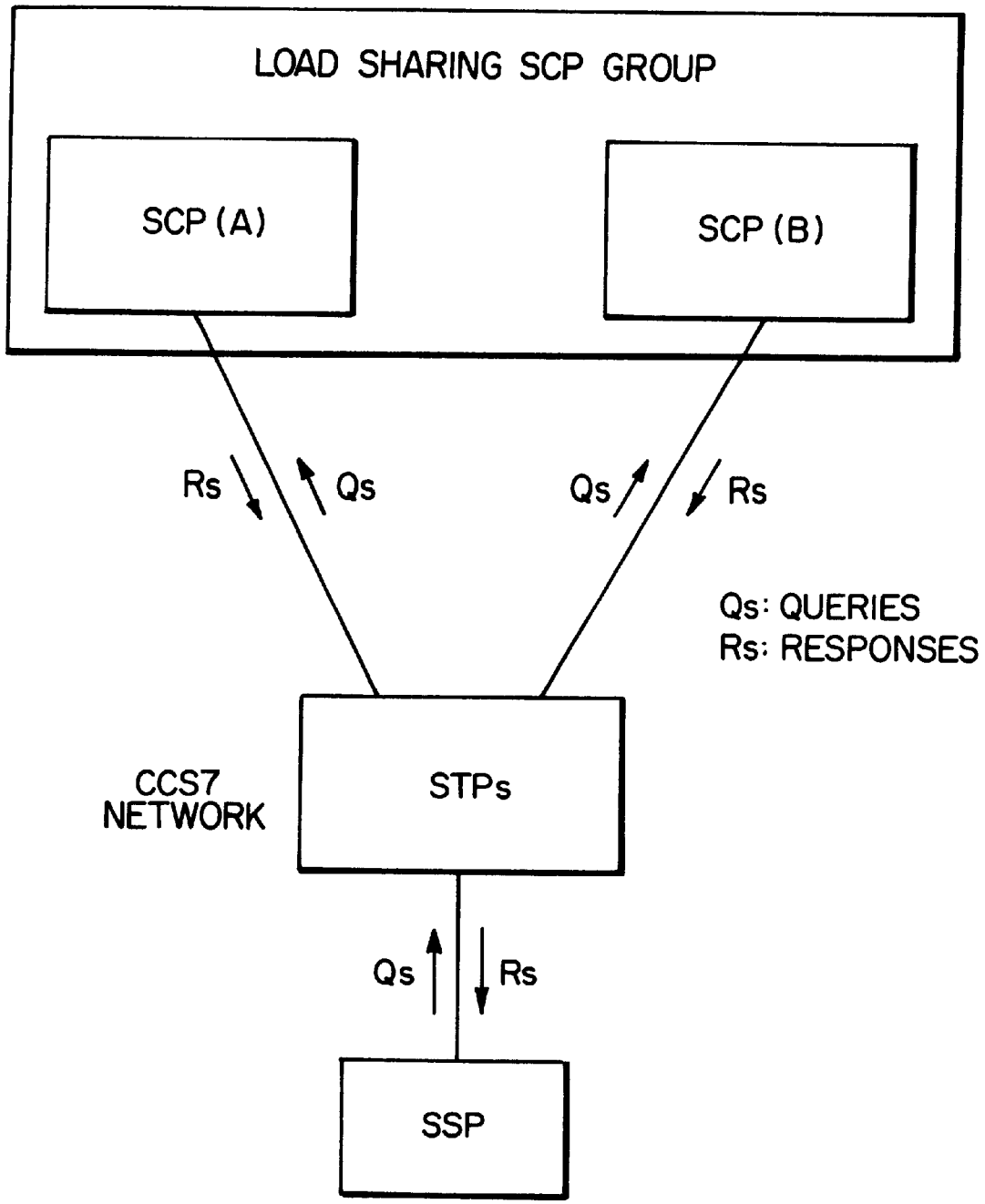
FIG. 4 is a schematic illustrating a prior art load sharing SCP group operations environment.
Figure 5:
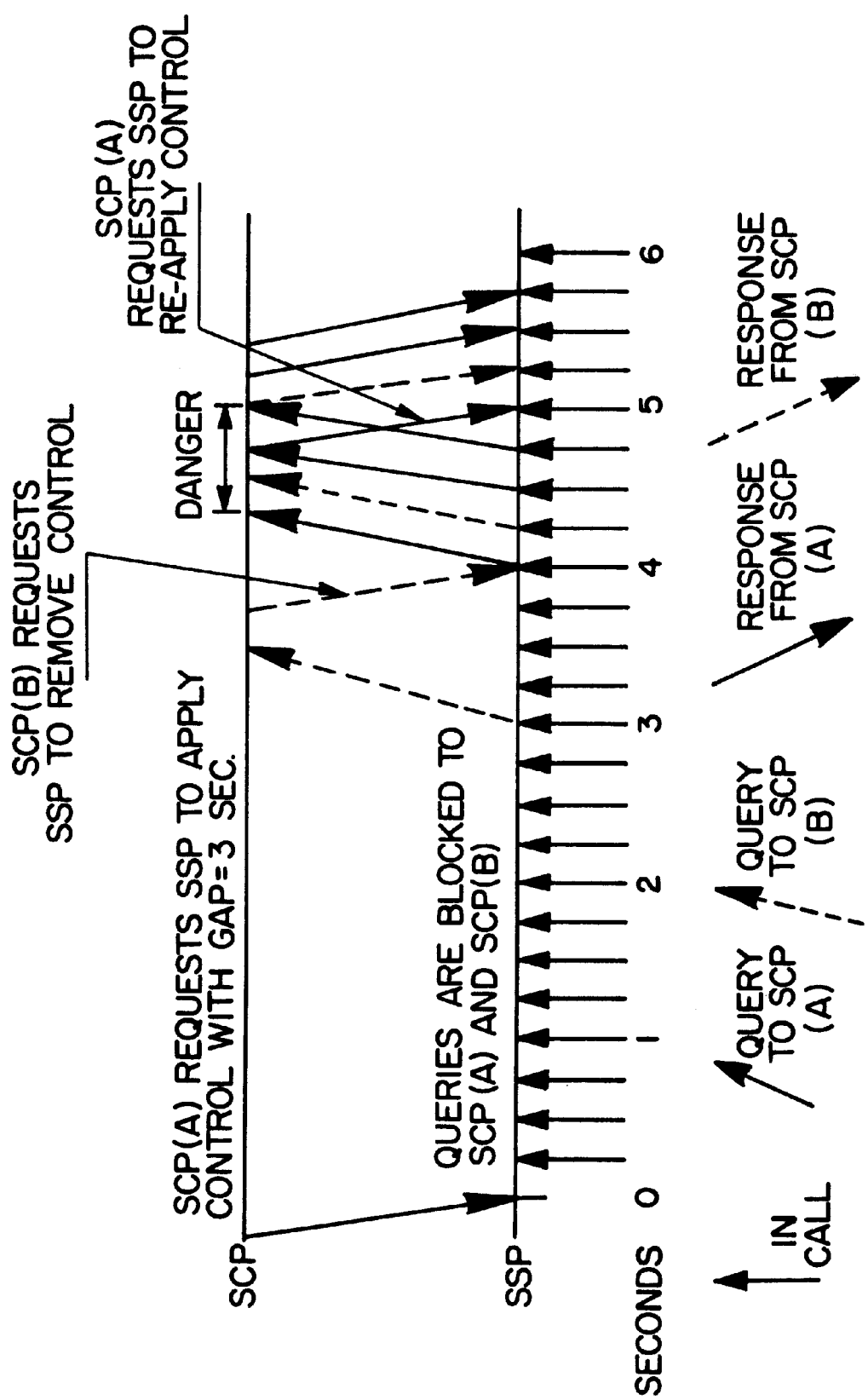
FIG. 5 is a timing graph illustrating an example of code gapping instability.
Figure 6:
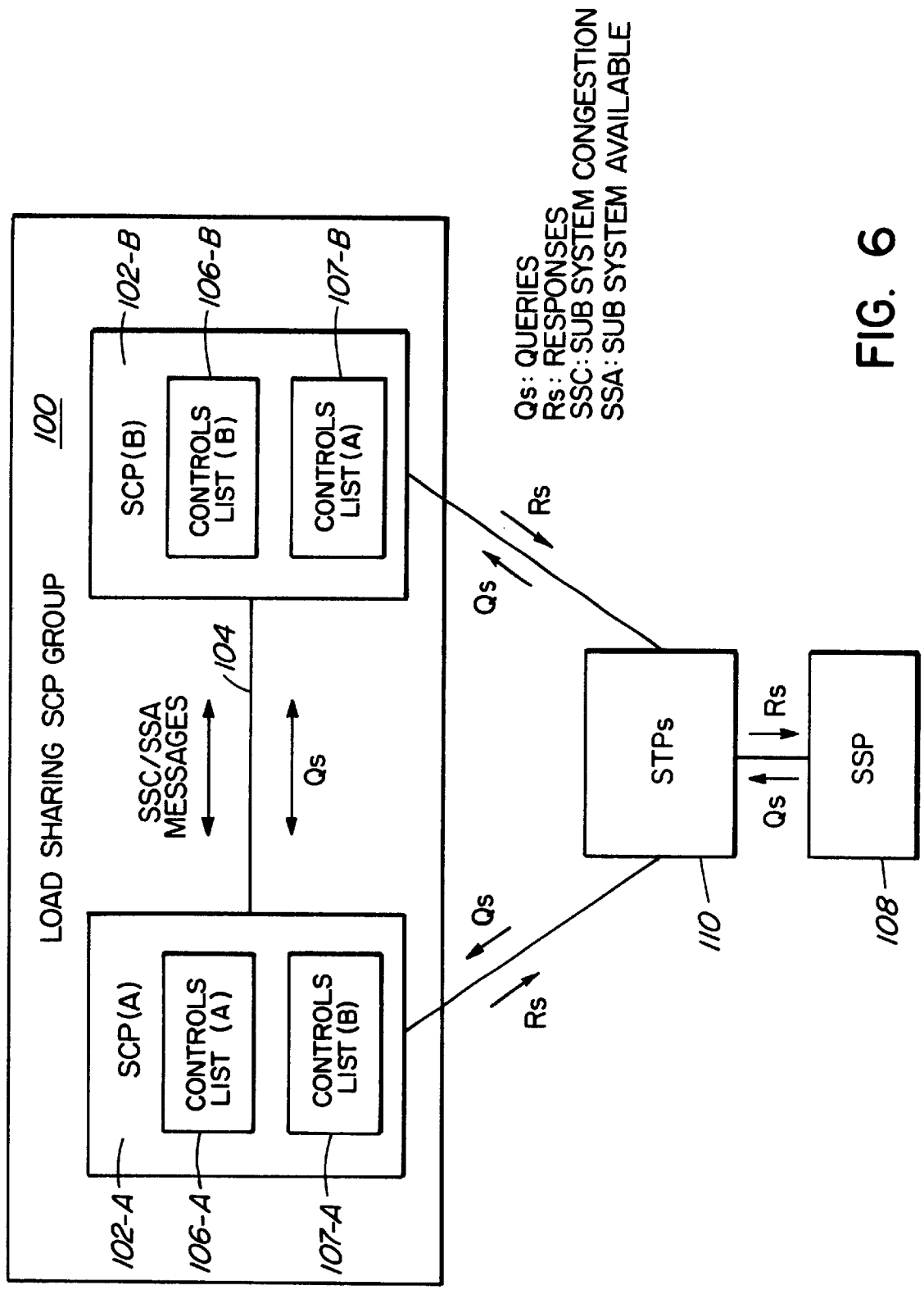
FIG. 6 is a schematic illustrating an embodiment of a load sharing SCP group, in accordance with the present invention.

Referring to FIG. 6, shown is an embodiment of a load sharing SCP group 100 having two (but may include more) SCPs 102, individually identified as SCP 102-A and SCP 102-B, which are coupled through a communications link 104. Each SCP 102 is responsible for maintaining and managing control status (or state) information in relation to the entire group 100. The control state information, for instance, may be in the form of individual controls lists for respective SCPs 102 constituting part of the load sharing group 100. In the particular embodiment shown in FIG. 6, SCP 102-A and SCP 102-B each will manage two controls lists: a first controls list 106 in which its own generated controls are recorded and a second controls list(s) 107 in which the other SCP generated controls are recorded. At SCP 102-A, its own controls list is identified as SCP-A controls list 106-A, and the controls list for SCP 102-B that is maintained by SCP 102-A is identified as SCP-B controls list 107-A. At SCP 102-B, its own controls list is identified as SCP-B controls list 106-B, and the controls list for SCP 102-A that is maintained by SCP 102-B is identified as SCP-A controls list 107-B. The SCPs 102 exchange messages relating to control status and update each other's controls lists 107 when overload levels changed. The communications link 104 allows the SCPs 102 to exchange messages and information on their overload control status. A copy of the controls lists 108 of every SCP 102 in the load sharing group 100 may also reside on a Service Management System (SMS) (shown in FIG. 1), so that the SMS may synchronize the controls on each SCP 102.

In operation, when one of the SCPs 102 in the load sharing group 100, for example SCP 102-A, receives a query message from the SSP 108 with an overload control indicator (e.g., an ACGEncountered parameter), it checks the two controls lists that it maintains, namely the SCP-A controls list 106-A which reflects its current control state and the SCP-B controls list 107-A which reflects the current control state of SCP 106-B, to verify if the control is active or needs to be updated.

When one SCP, e.g. SCP 102-A, requests overload control for a new GTA/TT, it adds the control to its SCP-A controls list 106-A and sends a message to the other SCP, SCP 102-B, with the new GTA/TT. When SCP 102-B receives the message from SCP 102-A, it updates the SCP-A controls list 107-B with the new GTA/TT. When SCP 102-A removes an existing control from its SCP-A controls list 106-A (when overload level changed), it sends a message to SCP 102-B with the new GTA/TT and then SCP 102-B updates the SCP-A controls lists 1-7-B which it is maintaining. The communications link 104 between the SCPs 102-A and 102-B ensures that both SCPs 102 are aware of their overload status, and enables the SCPs 102 to exchange their load and resource status.

To facilitate exchanging of controls list information, it is advantageous to provide the communication link 104 between the SCPs 102 in the group 100. This link allows each SCP 102 to readily communicate to the other load sharing SCP 102 any changes in its active controls list 106 (e.g., addition or deletion of a control), so that the other SCP 102 may update the controls list 107 being maintained for that SCP. The communications link 104 may be, for example, a direct data connection or a local area network (LAN) such as Ethernet. SCP status messages, including SubSystem Congestion (SSC) and Subsystem Available (SSA) messages are exchanged between the SCPs 102 over the link 104. It also provides a data link for routing the queries from an overloaded SCP to the other SCP.

If any SCP 102 in the load sharing group 100, say SCP 102-A in FIG. 6, is reaching a predetermined congestion threshold level for a specific SSN (e.g., a Calling Name Delivery (CNAM) service with SSN=233), SCP 102-A sends a SubSystem Congestion (SSC) message to the other SCPs in the group 100, in this example SCP 102-B, to inform SCP 102-B with SCP 102-A's overload status. Upon sending the SSC message, SCP 102-A will automatically re-route queries which are distend to it, to SCP 102-B, as long as the SCP-B controls list 107-A maintained by SCP-A does not reflect that SCP 102-B has an active control corresponding to the queries. The SCP 102-A threshold setting for congestion would be set to account for the processing required for re-routing queries to the other SCP 102.

Moreover, if the overload at SCP 102-A continues to increase to another predetermined congestion level, then SCP 102-A will request the SSP to apply code gapping for the type of query causing the overload and it may stop re-routing that query to SCP 102-B.

When the overload level on SCP 102-A decreases for this specific SSN (e.g., SSN=233), SCP 102-A sends a SubSystem Available (SSA) message to SCP 102-B to inform it with SCP 102-A's new status and availability to process queries.

When both SCPs, 102-A and 102-B, are overloaded, the queries distend to the load sharing SCP group 100 will be discarded. When the SSP Ti timer expires, the SSP routes the calls to final treatment or default routing.

With regard to SCP controls lists synchronization, when SCP 102-A generates a new GTA/TT control, it adds that control to its active SCP-A controls list 106-A and sends a message to SCP 102-B with this control information. When SCP 102-B receives the message from SCP 102-A, SCP 102-B updates the SCP-A controls list 107-B with the new control. When SCP 102-B generates a new control, it executes the same action as described previously in respect of the SCP 102-A generated control.

When SCP 102-A removes an existing control from its SCP-A controls list 106-A, for instance in response to a change in overload level, it sends a message to SCP 102-B with the new information. When SCP 102-B receives the message from SCP 102-A, SCP 102-B removes the identified control from its SCP-A controls list 107-B. For SCP 102-B to initiate removal of a control, it executes the same actions as described previously in respect of the SCP 102-A initiated removal.

The SCPs 102-A and 102-B check both active controls lists 106 and 107 when each receive a query from a SSP 108. If an ACGEncountered parameter is attached to the query, the SCPs 102 checks its own 106 and the other SCP controls lists 107 to verify if the control is activated.

The follow provides a particular encoding format for the SubSystem Congestion (SSC) and SubSystem Available (SSA) messages. It also defines a particular data link protocol to carry the SSC, SSA and queries between the SCPs 102 in the load sharing group 100. The message exchange sequence is also given. However, it should be understood that these specific operational parameters may be readily modified for adaptation to the requirements of the particular implementation.

FIG. 7 illustrates an exemplary encoding format common to both the SSC message and the SSA message. Each SSC and SSA message has a length of 24 Octets. The SSC and SSA messages include the following fields.

Message Type field: Parameter identifies the message type to-be either SSA or SSC.

Queries Indicator (QInd) field: Parameter in this field determines whether or not the queries distend to the SCP will be routed to the other SCP. The QInd field may be encoded as follows:

| Bit 1 | Indication |
| --- | --- |
| 0 | No queries are routed from the overloaded SCP |
| 1 | Queries are routed from the overloaded SCP. |

Length Indicator (LI) field: Parameter indicates the number of octets contained in the SSC or SSA message. Length is indicated as a binary number. A length indicator of value 0 (i.e., code "000000") designates a fill-in signal unit. If the information field of the message spans more than 62 octets, the length indicator is set to maximum value, namely 63 (code "111111").

SCP SubSystem Number (SSN) field: Parameter in this field identifies the IN process within the SCP. Several SSNs may identify respective IN processing within the SCP, (e.g., SSN=233 for Call Name Display service application). Each SSN is associated with a particular application processing on the SCP.

Machine Congestion Level 1 (MC1) field: Parameter identifies the first level of congestion on the SCP. If the SCP overload level reaches MC1, that SCP initiates a control for the particular type of query and subsequently routes similar queries to the other SCPs in the group.

Machine Congestion Level 2 (MC2) field: Parameter identifies the second level of congestion on the SCP. If the SCP overload level reaches MC2, it requests the SSP to apply gapping control and the routing of queries to the other SCP will be terminated.

Machine Congestion Level 3 (MC3) field: This field identifies the third level of congestion on the SCP. Overload above this level represents a failure state for the SCP. Queries are discarded.

Originating SCP Address (O_SCP_Address) field: Parameter in this field indicates from which SCP the SSC or SSA message came. The O_SCP_Address field identifies the address of the SCP and it is 3 Octets in length.

Destination SCP Address (D_SCP_Address) field: Parameter in this field indicates to which SCP the SSC or SSA message is being sent. The D_SCP_Address field identifies the address of the SCP and it is 3 Octets in length.

Global Title Address/Translation Type (GTA/TT) field: The GTA/TT parameter is converted at the Signaling Transfer Point (STP) to the SCP Point Code and SSN of the application running on the SCP. This field is 8 Octets and may be populated as-defined for standard IN messages.

SCP Congestion time (SCP_MC_Time) field: Depending on the context, the parameter in this field indicates either, in the SSC message, the time when the SCP is overloaded or, in the SSA message, the time when the overload level deceased. This field is 3 octets in length, for which an encoding is illustrated in FIG. 8 and described below.

Time Year field: In the first Octet of the SCP_MC_Time field, parameter may be encoded as follows:

| Bits 21 | Indication |
| --- | --- |
| 00 | Last year (value = 0) |
| 01 | Current year (value = 1) |
| 10 | Next year (value = 2) |
| 11 | Spare |

Time Month field: In the first Octet of the SCP_MC_Time field, parameter may be encoded as follows:

| Bits 6543 | Indication |
| --- | --- |
| 0000 | Spare |
| 0001 | January |
| 0010 | February |
| 0011 | March |
| 0100 | April |
| 0101 | May |
| 0110 | June |
| 0111 | July |
| 1000 | August |
| 1001 | September |
| 1010 | October |
| 1011 | November |
| 1100 | December |
| 1101 | Spare |
| 1110 | Spare |
| 1111 | Spare |

Time Null Indicator field: In the first Octet of the SCP_MC_Time field, parameter may be encoded as follows:

| Bits 87 | Indication |
| --- | --- |
| 00 | Null |
| 01 | Not Null |
| 10 | Reserved |
| 11 | Reserved |

Time Date field: In the second Octet of the SCP_MC_Time field, parameter may be encoded as follows:

| Bits 54321 | Indication |
| --- | --- |
| 00000 | Spare |
| 00001 | 1 |
| 00010 | 2 |

-continued

| Bits 54321 | Indication |
|---|---|
| 00011 | 3 |
| 00100 | 4 |
| 00101 | 5 |
| 00110 | 6 |
| 00111 | 7 |
| 01000 | 8 |
| 01001 | 9 |
| 01010 | 10 |
| 01011 | 11 |
| 01100 | 12 |
| 01101 | 13 |
| 01110 | 14 |
| 01111 | 15 |
| 10000 | 16 |
| 10001 | 17 |
| 10010 | 18 |
| 10011 | 19 |
| 10100 | 20 |
| 10101 | 21 |
| 10110 | 22 |
| 10111 | 23 |
| 11000 | 24 |
| 11001 | 25 |
| 11010 | 26 |
| 11011 | 27 |
| 11100 | 28 |
| 11101 | 29 |
| 11110 | 30 |
| 11111 | 31 |

Time Hour field: In the third Octet of the SCP_MC_Time field, parameter may be encoded as follows:

| Bits 54321 | Indication |
|---|---|
| 00000 | 0 |
| 00001 | 1 |
| 00010 | 2 |
| 00011 | 3 |
| 00100 | 4 |
| 00101 | 5 |
| 00110 | 6 |
| 00111 | 7 |
| 01000 | 8 |
| 01001 | 9 |
| 01010 | 10 |
| 01011 | 11 |
| 01100 | 12 |
| 01101 | 13 |
| 01110 | 14 |
| 01111 | 15 |
| 10000 | 16 |
| 10001 | 17 |
| 10010 | 18 |
| 10011 | 19 |
| 10100 | 20 |
| 10101 | 21 |
| 10110 | 22 |
| 10111 | 23 |
| 11000 | Spare |
| 11001 | Spare |
| 11010 | Spare |
| 11011 | Spare |
| 11100 | Spare |
| 11101 | Spare |
| 11110 | Spare |
| 11111 | Spare |

Time Minute field: Parameter in this field identifies the nearest quarter-hour. In the third Octet of the SCP_MC_Time field, the parameter may be encoded as follows:

| Bits 76 | Indication |
|---|---|
| 00 | 0 minutes |
| 01 | 15 minutes |
| 10 | 30 minutes |
| 11 | 45 minutes |

Figure 9:
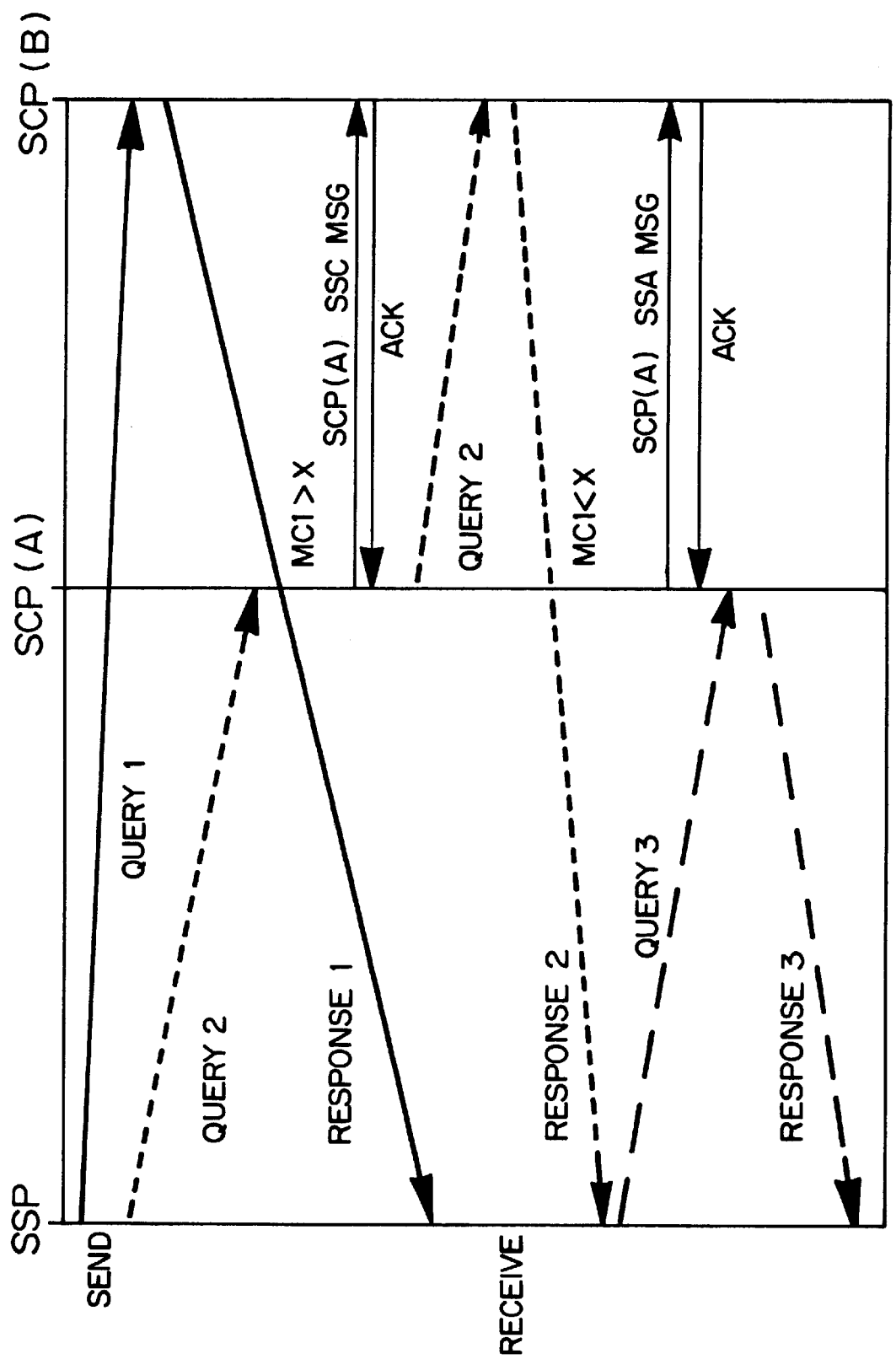
FIG. 9 is a timing graph illustrating message exchange between SCPs of a load sharing group and a SSP.

Turning now to FIG. 9, exemplified is the message exchange between the SSP, and SCP-A and SCP-B of the load sharing SCP group. Queries are generated as per [1] GR-1298-CORE, and the GTA/TT in such queries identifies the SCP for the service as is conventional. In accordance with the preferred implementation of the present invention, changes in the queries and messages exchanged between the SSP and the load sharing SCP group are not necessary. An example of a typical exchange is Query 1 and Response 1.

Within the load sharing group, in accordance with the present invention, SCP-A and SCP-B exchange control state information, via the communications link therebetween, using the SSC and the SSA messages. For instance, when congestion at SCP-A exceeds its machine congestion level 1 (MC1), SCP-A sends an SSC message indicating such to SCP-B which then updates the SCP-A controls list it maintains and replies to SCP-A with an acknowledgement message. Subsequently, Query 2 directed to SCP load sharing group may be forwarded via SCP-A to SCP-B which generates an appropriate response thereto. Once congestion at SCP-A decreases below its level 1 threshold, SCP-A sends an SSA message indicating this change in its control state to SCP-B which updates accordingly the SCP-A controls list it maintains and replies with an acknowledgement message. The communications link between SCP-A and SCP-B does not impact the existing flow of messages in the Intelligent Network, and message exchanges between the SCPs will have no impact on the current network operations.

The preferred embodiment of the SCP load sharing group consists of two SCPs in order to minimize utization of the capacity of each SCP forming the group. For multiple load sharing SCPS, communication links therebetween will produce a new overlaid network of SCPs. The number of controls lists on each SCP is proportional to the number of SCPs in the group. As the number of SCPs in load sharing SCP group increases, the number of controls lists on each SCP in the group increases accordingly. The SCPs messages exchanges and processing will impact the SCPs real time processing capacity. Synchronization of the controls lists on the SCPs and SMS may also be complex and real time consuming.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

I claim:

1. A method for synchronizing operation of a plurality of service control points (SCPs) in a load sharing group, comprising the steps of:

maintaining, by each SCP, respective controls lists for the plurality of SCPs, each controls list identifies controls which are active at the corresponding SCP;

generating a new control by any one SCP of the plurality of SCPs in the load sharing group;

at the any one SCP, updating the controls list corresponding to itself to add the new control and sending an add control signal which identifies the new control to all other SCPs of the plurality of SCPs in the load sharing group;

at each of the other SCPs, updating the controls list corresponding to the any one SCP, that each maintains, to add the identified new control;

at the any one SCP of the plurality of SCPs in the load sharing group, updating the maintained controls list corresponding to itself to remove an existing control therein and sending a remove control signal which identifies the existing control to the other SCPs of the plurality of the SCPs in the load sharing group; and at each of the other SCPs, updating the controls list corresponding to the any one SCP, that each maintains, to remove the identified existing control;

wherein the step of generating the new control includes receiving, by the any one SCP, a query which results in the any one SCP being overloaded; and further comprising routing, based on the respective controls lists for the other SCPs that are maintained by the any one SCP, the query to an available SCP of the other SPCs which does not have an active control corresponding to the query;

and wherein the plurality of SCPs are interconnected by a communications link, by which the add control signal and the remove control signal are sent from the any one SCP to the other SCPs in the load sharing group;

and wherein the query is routed from the any one SCP over the communications link to the available SCP;

and wherein individual controls in the controls lists are identified by a global title address and translation type, and each query includes respective indications for the global title address and the translation type.

2. A method as claimed in claim 1, wherein the any one SCP is overloaded when the predetermined congestion level which is associated with the global title address and the translation type indicated in the received query is reached;
and the add control signal includes an address of the any one SCP, the global title address and the translation type.

3. A method as claimed in claim 2, wherein the add control signal indicates one or more levels of congestion on the any one SCP.

4. A method as claimed in claim 1, further comprising disregarding queries which have a corresponding active control in all of the respective controls lists for the plurality of SCPs in the load sharing group.

5. A load sharing group of service control points (SCPs), comprising:

two SCPs; and a communications link interconnecting the two SCPs;

wherein the two SCPs each maintains a first controls list which identifies active controls at that SCP and a second controls list which identifies the active controls at the other SCP;

and wherein when either of the two SCPs adds a new control to its first controls list, that SCP sends a subsystem congestion message which identifies the new control, over the communications link, to the other SCP which in response updates its second controls list by adding the identified new control; and wherein when either of the two SCPs removes an existing control from its first controls list, that SCP sends a subsystem available message which identifies the existing control, over the communications link, to the other SCP which in response updates its second controls list by removing the identified existing control;

and wherein new control in the subsystem congestion message or the existing control in the subsystem available message are identified by a global title address and translation type.

6. A load sharing group as claimed in claim 5, wherein the subsystem congestion message and the subsystem available message each includes an originating SCP address, a destination SCP address, and one or more levels of congestion.

\* \* \* \* \*